United States Patent Office 3,338,901
Patented Aug. 29, 1967

3,338,901
METHOD FOR PRODUCING AMORPHOUS QUATERNARY NITROGEN COMPOSITIONS
Helmut Hans Wilhelm Weldes, Havertown, Pa., assignor to Philadelphia Quartz Company, Philadelphia, Pa., a corporation of Pennsylvania
No Drawing. Original application Aug. 15, 1961, Ser. No. 131,490, now Patent No. 3,239,521, dated Mar. 8, 1966. Divided and this application Oct. 21, 1965, Ser. No. 500,327
3 Claims. (Cl. 260—268)

INTRODUCTION

This is a division of application Ser. No. 131,490, now U.S. Patent No. 3,239,521, filed Aug. 15, 1961, and is a continuation-in-part of copending application Ser. No. 50,877, now U.S. Patent No. 3,239,549, filed Aug. 22, 1960.

This invention generally relates to the production and use of soluble sodium-free hydroxylated organic quaternary nitrogen silicates. In one particular embodiment this invention relates to the production and use of sodium-free tetraethanol-ammonium silicates and derivatives thereof.

BACKGROUND

Water-soluble alkali metal silicates are favored components of (1) refractory and rapid-setting cements, (2) inorganic coatings having a refractory or weather-resistant character and (3) numerous adhesives. However, in certain uses they have drawbacks which are associated with the alkali metal component, and it has long been an objective to prepare a soluble silicate useful in these various fields which is free of any alkali metal component. For instance, in a refractory cement the presence of the alkali metal salt lowers the softening point of the cement because of the fluxing characteristic of the salt. Efforts to overcome this have been made by increasing the silica ratio of the soluble silicate but some alkali metal salt always remains even after neutralization and excessive washing. Furthermore, the alkali metal silicate solutions increase in viscosity rapidly as the concentration increases at high silica ratios so that in commercial solutions prepared at about the 4.0SiO$_2$:Na$_2$O ratio the solid content will be no higher than 30%. Furthermore, where the silica ratio is high, the softening point of the anhydrous sodium silicate also is high.

One aspect of this invention broadly involves the discovery of soluble amorphous sodium-free organic N-containing silicates which overcome the aforementioned drawbacks of soluble alkali metal silicates. In another specific aspect of the invention, I believe that I am the first person to discover sodium-free tetraethanolammonium silicate and methods for producing same. *The tetraethanolammonium silicate which I have discovered does not appear to crystallize readily since I have not been able to obtain crystals after many attempts.*

THE INVENTION

This invention broadly encompasses amorphous compositions having the general oxide formula with continuously variable ratios:

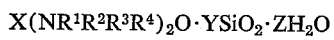

In the above formula:

N represents a nitrogen atom;
$n$ is a small integer, less than 10 and preferably less than five;
X, Y and Z represent numbers defining the relative amounts of each of the component parts of the compound. X is 1, Y is preferably between 0.5 and 20, and Z is preferably between 0 and 99, and wherein up to four R groups are associated with each N;
R represents organic radicals having between 1 and 20 carbon atoms, at least two of said organic radicals consisting of omega hydroxy alkyl groups (preferably two or more of these R groups are ethanol groups and the others derivatives of ethanol groups);
$p$ is at least 4 and up to $4n$ and is equal to the number of R groups; and
$s$ is an integer from 1 to $p$, indicating the number of different types of R groups.

According to one specific embodiment the invention relates to the production of amorphous compositions having the formula:

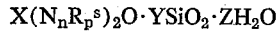

wherein N, X, Y and Z have the significances noted above and R$^1$, R$^2$, R$^3$ and R$^4$ represent alkanol radicals containing between about 1 and 20 carbon atoms.

The tetraethanolammonium silicates of this invention can form aqueous solutions of over 50% solids content at viscosities at which the solution is readily useful (such as 2 poises). Such solutions may have as high as 15 moles of SiO$_2$ to 1 mole of organic alkali (i.e. the organic base) and yet be readily soluble and have a relatively low melting point which is representative of organic compounds rather than the inorganic salts. The organic base portion can be readily removed, leaving a silica cement in place. This may be accomplished either by heating or by neutralization and removal of the soluble organic base salt. Thus, this new compound and its derivatives have an important place in the formulation of refractory and rapid-setting cements as well as in coatings for roofing granules and shingles, in special adhesives, in investment molds for casting metals, and the like.

I have found that tetraethanolammonium silicates and their derivatives form stable, water-free compositions which are easily soluble in water. These compositions have a range of mole ratio of SiO$_2$ to quaternary ion from about 0.5 to 1.0 (i.e. a mole ratio of SiO$_2$ to quaternary oxide of about 1 to 2), or lower, to about 15 to 1 (i.e. about 30 to one on the quaternary oxide ratio), or higher. These pure compositions vary from viscous oily liquids at the lower ratios to pliable solids in the higher range and, finally, to brittle solids. At a ratio of about 21, the dehydrated solid becomes insoluble. These compositions below about ratio 15 are miscible in all proportions with water. The silica is present in aqueous solutions of such compositions largely as crystalloidal silica under equilibrium conditions. They have a relatively high pH but a viscosity much lower than that of a sodium silicate solution having a similar solids content and silica ratio. Soluble silicate solutions above a molecular ratio of 4.0 are so difficult and costly to manufacture and so relatively unstable at high concentrations that they have never been commercially available. Thus, in the sodium system a ratio of 4.0 has been considered the maximum. As pointed out above, this 4.0 ratio material can be concentrated usefully only to about 30% solids whereas the 12 ratio organic base silicate will readily form solutions of reasonable viscosity at more than 50% solids content.

METHODS OF PREPARATION

The compounds of this invention may be prepared in a number of ways. Such methods include, for example:

(a) Removing the alkali metal ion from alkali metal hydroxylated quaternary ammonium silicates by use of a suitable base exchange resin;
(b) dissolving sodium-free silica in sodium-free hydroxylated organic quaternary ammonium bases;

(c) dissolving sodium-free silica in sodium-free tetra-ethanolammonium silicate solutions;

(d) the sodium may be leached from the less soluble sodium hydroxylated quaternary ammonium silicate crystals;

(e) reacting ammonia or an amine and ethylene oxide with finely divided silica hydrate or silica gel, or a colloidal silicia sol.

The following examples are illustrative of the invention:

Example 1
PREPARATION OF SODIUM-FREE HYDROXYLATED ORGANIC AMMONIUM SILICATES In a reaction flask equipped with a stirrer, thermometer, a low-temperature reflux condenser and a gas inlet tube, 30 grams of aqueous 29% $NH_3$ solution were admixed with 1110 grams of Ludox LS. No gelation or coacervation occurred, and 92.5 grams of ethylene oxide were distilled into the agitated mixture through the gas inlet tube. The temperature was maintained between 24 and 26.5° C. The ethylene oxide was distilled over in the course of about one hour, and the reaction was continued for 6 more hours and then left at room temperature overnight in a closed vessel. The next morning the water was distilled off by vacuum distillation. Part of the solution was removed when it contained 50% $SiO_2$ and the remainder was taken to dryness.

In the 50% solution, the analysis was 14.39% of quaternary ion and 52.53% of $SiO_2$ with a mole ratio of 11.81 of $SiO_2$:1.0 of quaternary ion. This solution had a specific gravity at 20°/20° of 1.512 and a viscosity at 20° C. of 2.8 poises. The material taken to dryness was solid but easily soluble in water, even though the mole ratio was 11.81 $SiO_2$ to 1 of quaternary ion. This corresponds to a ratio of 1.0 quaternary ammonium oxide: 23.6$SiO_2$:49.8$H_2O$. It was not soluble in methanol or ordinary organic solvents. With increasing silica ratio the solubility in methanol declines.

Following the same procedure, a composition having a mole ratio of about 21 was prepared by allowing 444 grams of Ludox HS, 6 grams of aqueous 29% $NH_3$ and 18.5 grams of ethylene oxide to react. After the reaction was completed and the mixture contained in a closed vessel overnight, the water was distilled off. This left a solid, white material which was very brittle and easily broken into small particles. It appeared to be insoluble in water. Thus, the limiting ratio at which the solid anhydrous material was completely miscible with water is probably about 15 to 16.

Example 2
SODIUM-N,N,N',N'-TETRA-(2-HYDROXYETHYL)-PIPERAZINIUM SILICATE

A sodium-N,N,N',N'-tetra - (2-hydroxyethyl) - piperazinium silicate may be prepared either from N,N'-bis-(2-hydroxyethyl)-piperazine with sodium silicate and 2 moles of ethylene oxide, or from unsubstituted piperazine and 4 moles of ethylene oxide with the sodium silicate. Such a reaction was carried out by dissolving 34 grams of the N,N'-bis-(2-hydroxyethyl)-piperazine in 300 grams of water and mixing this with 240 grams of "E" sodium silicate in the reaction flask. The reaction was carried out between 23 and 30° C. beginning at the lower temperature with a clear, yellowish solution. The 36 parts ethylene oxide were distilled over in 52 minutes, forming a heavy coacervate which dissolved in about 20 minutes. The reaction was allowed to continue for about 6 hours at which time it was again a clear, yellowish solution. This solution was kept overnight and crystals had begun to form at that time. 260 grams of water were distilled off and the final mixture of crystals and solution was put in a refrigerator at about 2° C. overnight. Crystals were then filtered off and were washed four times with water. This product had an ignited loss of 74.91% and contained 44.08% of quaternary ion, 30.83% of water, 24.16% of $SiO_2$ with 1.01% of $Na_2O$. When these crystals were washed with alcohol instead of water, the $Na_2O$ content was about 4.5%. The product containing 1% of $Na_2O$ had no real melting point but became damp at about 115° C. and turned brown without melting at about 120° C.

When the product was washed 10 additional times, with a total of 1500 ml. of water to 5 grams of the product, the residue was found to have an ignited loss of 72.85% with 35.31% of quaternary, 37.54% of $H_2O$ and 26.41% of $SiO_2$ with only 0.09% of $Na_2O$. Thus this product has a mole ratio of 3.3 $SiO_2$ to 1.0 of quaternary ion and 15.6 moles of $H_2O$. Since the quaternary ammonium ion contains two basic nitrogens the oxide ratio has exactly the same ratio as the ion ratio, that is 1 quaternary ammonium oxide:3.3$SiO_2$:15.6$H_2O$. It decomposes without melting at 118° C. This final product is somewhat soluble in water and gives a solution with a pH of about 10.5.

A number of the materials used in the preceding examples are described as follows:

The alkali metal silicates, supplied by the Philadelphia Quartz Co., are characterized in the following table:

Trademark E:
  Ratio, percent $Na_2O$:$SiO_2$ _____ 1:3.22
  $Na_2O$, percent _____ 8.60
  $SiO_2$, percent _____ 27.7
  $H_2O$, percent _____ 63.6

Ammonium hydroxide was the 28–30% aqueous Reagent Grade supplied by Allied Chemical Co.

The ethylene oxide with a purity of about 99.5% was supplied by Matheson Company, Inc.

Two colloidal silica sols sold by the Du Pont de Nemours Co. as Ludox HS and Ludox LS had the following composition:

| Physical properties | Ludox HS | Ludox LS |
| --- | --- | --- |
| Percent colloidal silica as $SiO_2$ | 30 | 30 |
| Ratio, wt. $SiO_2$/$Na_2O$ | 95 | 285 |
| Viscosity at 25° C., cps | 3.6 | 13 |
| pH at 25° C. | 9.8 | 8.4 |
| Surface area (BET), m.²/g | 210 | 210 |
| Particle diameter, mμ | 15 | 15 |
| Chloride as NaCl, percent | 0.04 | 0.002 |
| Sulfate as $Na_2SO_4$, percent | 0.05 | 0.006 |

ANALYTICAL PROCEDURES

In analyzing the quaternary ammonium silicates, special procedures are necessary.

*Ignition loss.*—The ignition loss is determined with a sample of quaternary silicate weighing one gram. This sample is heated in a covered platinum crucible, raising the temperature very, very slowly. If the ignition is carried out too fast, silicon carbide forms and it is almost impossible to burn it off. Therefore the crucible is heated extremely slowly on one side until all of the organic matter has charred completely. This procedure takes about one hour, then the heat is increased slowly to the full blast of a Tirrel burner and continued until the sample has turned completely to either white powder or a clear white melt. This takes about two more hours. When the sample is white in color it is transferred to a Fisher burner and heated full blast for a further half hour.

*Quaternary ammonium base.*—The nitrogen content is determined using the Kjeldahl procedure with special modifications as indicated. About 0.75 gram of the silicate are taken as a sample. This sample is weighed into a 500 ml. round-bottom, two-necked flask and 10 grams of dehydrated $K_2SO_4$ and 2 grams of dehydrated $CuSO_4$ are added thereto. After admixing 12 ml. of concentrated $H_2SO_4$, a reflux glass tube is set on top of the flask and the mixture heated over a wire gauze in a hood slowly and cautiously, close to the boiling point of the sulfuric acid. Heating is continued until the originally dark solution becomes clear and no dark specks remain. This digestion period takes between 3 to 24 hours, depending on the composition. After the contents are cooled to room temperature, 100 ml. distilled water are added carefully through the reflux tube while swirling the contents. Then a few Alundum boiling stones are added and a magnetic stirrer. The reflux glass tube is removed and the flask is connected to the distillation equipment. The end of the condenser dips into a receiver containing 100 ml. of distilled water with excess 0.2 normal HCl over the expected equivalent of ammonia. About 130 ml. of 6-normal sodium hydroxide are added to the reaction flask through a dropping funnel while stirring with a magnetic stirrer. When all of the sodium hydroxide is added, the reaction mixture is headed for an hour to vigorously boiling. The ammonia formed during the digestion is driven over into the acid solution and after completion the free hydrochloric acid is back titrated with 0.2-normal NaOH.

*Silica determination.*—Silica in solution may be determined using the usual volumetric method and the gravimetric method may be used for insoluble silica (Vail, Soluble Silicates, vol. I, p. 40.)

PRODUCT PROPERTIES

*Viscosity.*—The aqueous solutions of the sodium-free products in accordance with this invention are quite alkaline and concentrated solutions are quite viscous. For instance, a solution of 74% of a tetraethanolammonium silicate having a ratio of 0.53 $SiO_2$ to quaternary ion (i.e. 1.06 $SiO_2$ to 1 quaternary ammonium oxide) had a pH of 12.8 and a viscosity at 20° C. of 8.0 poises. At 50° C. the viscosity had dropped to 1.1 poises. On the other hand, a solution of a product containing 70% of 8.7 ratio ($SiO_2$ to quaternary ion or 17.4 $SiO_2$ to quaternary ammonium oxide) material with 30% of water had a pH of 11.08 and a viscosity at 20° C. of 14.1 poises; at 50° C. the viscosity was 6.0 poises. A solution containing 50% silica prepared from a tetraethanolammonium silicate of the mole ratio of 11.8 $SiO_2$ to 1.0 quaternary ion (or 23.6 $SiO_2$ to 1 quaternary ammonium oxide) had a viscosity at 20° C. of 2.8 poises.

*Gelation vs pH.*—A sodium-free quaternary tetraethanolammonium silicate having a ratio of 2.74 $SiO_2$:1.0 quaternary ion (or 5.48 $SiO_2$ to 1 quaternary ammonium oxide) and a concentration of 42.08% $SiO_2$ was diluted with water to 30% $SiO_2$ and gradually neutralized with sulphuric acid. The initial pH was 11.3. At a pH of about 10.5, the mixture became very viscous but did not gel, and gradually the pH rose again to 10.8 during the course of 24 hours. When this was again reduced to a pH of 10.5, the mixture appeared to gel in about 2 to 4 minutes but reliquefied overnight, forming a clear, very viscous solution. Again, at a pH of 10.4, a gel-like structure formed after 1.5 minutes, but this also reliquefied after 4 days, forming a clear and viscous solution. At a pH of 9.85 a gel formed which did not redissolve or reliquefy over a period of more than 2 weeks.

On the other hand, a 3% solution was treated with 3% $H_2SO_4$ with a pH lowered gradually to about 2. In these solutions no gel formed, but rather a finely divided silica. This lack of gelation must be related to the fact that the silica in these solutions is crystalloidal rather than collodial.

*Flms.*—A sodium-free tetraethanolammonium slicate having a mole ratio of 8.7 $SiO_2$ (or 17.4 $SiO_2$ to 1 quaternary ammonium oxide) had a concentration of 45.7% $SiO_2$ and 17.02% of quaternary. Films were cast on small metal dishes and dried at room temperature, 100°, 200°, 400° and 800° C. The weight loss and solubility of these films were determined. The alkali in the films remained quite soluble even after drying at 100° C., but on drying to 200° C., and especially above 200° C., much less alkali could be dissolved out. The silica in these films, even those dried at room temperature, was rather insoluble. The amount of silica dissolved by boiling 2.5 grams of a film dried at room temperature in 50 ml. of water 15 minutes was 2.7%. This was reduced to 1.2% after heating at 400° C., and to less than 1% after heating at 800° C.

A more alkaline material having a ratio of 4.8 (or 9.6 $SiO_2$ to 1 quaternary ammonium oxide) was used as a solution containing 41.0% $SiO_2$ and 27.55% of quaternary ion. 59% of the silica was soluble after drying at 100° C. but after drying at 200° C. only 2.6% was soluble, and at 400° C., and higher, less than 1% was soluble. These films had no adhesion to metal or glass. The quaternary ion was soluble in both films after curing at 100° C. At 200° C., and above, it appears that the organic ion breaks down and evaporates to some extent. About 50% was lost by curing 30 minutes at 200° C., and this appears to be more noticeable in the ratios containing higher quaternary nitrogen alkali.

The more siliceous films crack completely when dried at room temperature for 16 hours, whereas low ratio films, for instance those having a ratio of about 4, form hard, smooth surfaces at room temperature which do not change for almost 4 days, at which time a light cracking around the edges is observed. Neither do they crack at 100° C. However, on curing at 200° C. these films do crack and turn tan in 5 minutes. The films all break down and turn brown when cured at 400° C. and cannot be scrubbed off the plates.

The film stability may be increased by adding material such as urea or Polyox WSR 35, a high molecular weight ethylene oxide polymer sold by Union Carbide Chemicals Co. Glycerine was also good in the more alkaline ratio materials. The same may be said for cane sugar, sorbitol and hexamethylenetetramine.

*Adhesives.*—An adhesive solution was prepared from a sodium-free tetraethanolammonium silicate having a silica ratio of 5.44 (or 10.9 $SiO_2$ to 1 quaternary ammonium oxide), with a total solids content of 68.27%. The viscosity at 20° C. was 2.33, and the pH was 11.4. After setting at room temperature, B flute single face kraft board bonded with this adhesive had a pin adhesion strength of 43.4 pounds per 12 inches of flute tip. Setting the bond at higher temperatures reduced this strength as, for instance, at 94° C. the strength was only 37.4 lbs., and at 232° C. the strength was only 8 lbs. per 12 inches of flute tip. In all cases, the wet strength was less than one-half pound.

Apparently because of the crystalloidal nature of the solutions, those solutions having higher silica ratios gave weaker bonds.

*The use of quaternary ammonium silicates for water treatment.*—For some time in the water treatment field there has been a need for a soluble silicate which could be used in the form of dry feed for the formation of activated silica sols applicable as coagulant aids in the treatment of raw and waste waters. It has now been found that dry soluble silicates of both the sodium tetraethanolammonium silicate and the sodium-free tetraethanolammonium silicate, as well as other organic silicates of similar type, are very effective in the formation of sols which act as coagulant aids. It is expected that acid salts could be combined with these solid organic alkalies and, if desirable, clay or other forms of weighting agent might be added, thus forming a prepared dry material to be used with dry feed equipment in the formation of coagulant aids based on activated silica. Such a formulation would make unnecessary the purchase of expensive units now required for the preparation of sols from liquid raw materials.

The alkali metal silicates and alkali metal quaternary ammonium silicates will form stable solutions with insignificant amounts of most water miscible organic solvents.

For instance, a solution of sodium silicate having a mole ratio of $1Na_2O:3.22SiO_2$ and containing 15% $SiO_2$ will accept only about 0.5% of either methanol, ethanol, isopropanol, acetone, dioxane or tetrahydrofuran. A sodium tetraethanolammonium silicate with a mole ratio of $1Na_2O:1.1$ quarternary ion:$3.9SiO_2$ (or $1Na_2O:0.55$ quarternary ammonium oxide:$3.9SiO_2$) in an aqueous solution with 15% $SiO_2$ will accept less than 1% of the above water miscible solvents. On the other hand, alkali free tetraethanolammonium silicates with mole ratios varying from 1 quarternary ion:$2.74SiO_2$ to $1:10.42$ (or 1 quarternary ammonium oxide:$5.48SiO_2$ to $1:20.84$) in aqueous solutions containing 15% $SiO_2$ will accept from 30 to 80% of the above solvents, and such aqueous solutions containing 50% $SiO_2$ will accept from 20 to 40% of these solvents. Miscibility increases with decreasing silica concentration and ratio. It also tends to decrease in the order methanol, ethanol, isopropanol, acetone, dioxane, tetrahydrofuran. These results suggest the application of my new sodium-free quarternary ammonium silicates in paints, coatings and liquid detergent systems, for example, in which soluble silicates were never compatible heretofore.

In the foregoing specification, wherever the term "sodium" is referred to it will be understood that the result would be substantially the same when using other alkali metals such as potassium, lithium, etc.

What is claimed is:

1. The method of producing an amorphous quaternary nitrogen composition having the formula:

$$X(NR^1R^2R^3R^4)_2O \cdot YSiO_2 \cdot ZH_2O$$

wherein X, Y and Z represent numbers defining the relative amounts of each of the component parts of the compound and X is 1, Y is between 0.5 and 20, and Z is between 0 and 99, and $R^1$, $R^2$, $R^3$ and $R^4$ represent alkanol radicals containing between about 1 and 20 carbon atoms, which comprises:
   (a) starting with the known alkali metal salt of the above composition,
   (b) leaching the alkali metal ion from the quaternary ammonium silicate crystals with an aqueous liquid, and
   (c) recovering a substantially alkali metal-free amorphous quaternary nitrogen composition of the above formula.

2. A method according to claim 1 wherein $R^1$, $R^2$, $R^3$ and $R^4$ are each ethanol radicals.

3. The method of producing N,N,N',N'-tetra-(2-hydroxyethyl)-piperazinium silicate which comprises:
   (a) starting with the sodium salt of the above composition,
   (b) leaching the alkali metal ion from the quaternary ammonium silicate crystals with an aqueous liquid, and
   (c) recovering a substantially alkali metal-free amorphous quaternary nitrogen composition of the above formula.

References Cited
UNITED STATES PATENTS

| | | | |
|---|---|---|---|
| 2,689,245 | 9/1954 | Merrill | 260—448.2 |
| 3,239,521 | 3/1966 | Weldes et al. | 260—268 |
| 3,239,549 | 3/1966 | Weldes et al. | 260—268 |

FOREIGN PATENTS 709,634  6/1954  Great Britain.

ALEX MAZEL, *Primary Examiner.*

HENRY R. JILES, *Examiner.*

JAMES W. ADAMS, *Assistant Examiner.*